United States Patent
Kibsey et al.

(10) Patent No.: US 12,228,046 B2
(45) Date of Patent: Feb. 18, 2025

(54) AUXETIC THREE-DIMENSIONAL STRUCTURE UTILIZED IN ADDITIVE MANUFACTURING APPLICATIONS

(71) Applicant: Siemens Energy Global GmbH & Co. KG, Munich (DE)

(72) Inventors: Mitch Kibsey, Verdun (CA); Megan Schaenzer, Montréal (CA)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 108 days.

(21) Appl. No.: 17/996,340

(22) PCT Filed: Apr. 15, 2020

(86) PCT No.: PCT/US2020/028235
§ 371 (c)(1),
(2) Date: Oct. 15, 2022

(87) PCT Pub. No.: WO2021/211108
PCT Pub. Date: Oct. 21, 2021

(65) Prior Publication Data
US 2023/0203951 A1 Jun. 29, 2023

(51) Int. Cl.
*F01D 5/14* (2006.01)
*B22F 5/04* (2006.01)
(Continued)

(52) U.S. Cl.
CPC ............... *F01D 5/147* (2013.01); *B22F 5/04* (2013.01); *B22F 10/28* (2021.01); *B29C 64/40* (2017.08);
(Continued)

(58) Field of Classification Search
None
See application file for complete search history.

(56) References Cited

U.S. PATENT DOCUMENTS 7,655,195 B1 2/2010 Ichikawa et al.
8,652,602 B1 2/2014 Dolla
(Continued)

FOREIGN PATENT DOCUMENTS

CN 1327410 A 12/2001
CN 106457748 A 2/2017
(Continued)

OTHER PUBLICATIONS

Li Zhuoran / Study of Deformation Characteristics of Auxetic Structures; Heilongjiang Science and Technology Information; 2096-4390 2018 11-0007-05 / Nov. 30, 2018.
(Continued)

*Primary Examiner* — Daniel J. Schleis (57) ABSTRACT

An auxetic (NPR) structure includes a plurality of vertical intersecting dimpled sheets, each dimpled sheet exhibiting a negative Poisson's ratio, each dimpled sheet intersects two adjacent dimpled sheets creating a rectangular tubular structure, and having a portion of each dimpled sheet projecting outward from its intersection with an adjacent dimpled sheet, the amplitude of each dimple on the plurality of dimpled sheets is such that no overhanging surface of the dimpled sheet exceeds an angle threshold for printability without support structures.

17 Claims, 9 Drawing Sheets

(51) Int. Cl.
*B22F 10/28* (2021.01)
*B29C 64/40* (2017.01)
*B33Y 10/00* (2015.01)
*B33Y 80/00* (2015.01)
*F01D 5/28* (2006.01)

(52) U.S. Cl.
CPC ............... *B33Y 10/00* (2014.12); *B33Y 80/00* (2014.12); *F01D 5/28* (2013.01); *B22F 2301/15* (2013.01); *F05D 2220/32* (2013.01); *F05D 2250/184* (2013.01); *F05D 2300/17* (2013.01)

(56) References Cited

U.S. PATENT DOCUMENTS

| | | |
|---|---|---|
| 2017/0009036 A1 | 1/2017 | Min et al. |
| 2017/0129146 A1 | 5/2017 | Changchun et al. |
| 2018/0009257 A1 | 1/2018 | Bertoldi et al. |
| 2018/0264775 A1* | 9/2018 | Bertoldi .................. B05C 1/00 |
| 2019/0145263 A1* | 5/2019 | Rockstroh ................ F01D 5/14 415/200 |
| 2021/0003351 A1 | 1/2021 | O et al. |

FOREIGN PATENT DOCUMENTS

| | | |
|---|---|---|
| CN | 106541568 A | 3/2017 |
| CN | 106687270 A | 5/2017 |
| CN | 108367536 A | 8/2018 |
| CN | 110210085 A | 9/2019 |
| DE | 102014209589 A1 | 11/2015 |
| EP | 2022622 A1 | 2/2009 |
| EP | 3595333 A1 | 1/2020 |
| WO | 2015119694 A2 | 8/2015 |
| WO | 2016112366 A1 | 7/2016 |
| WO | 2016112367 A2 | 7/2016 |
| WO | 2019167491 A1 | 9/2019 |
| WO | 2019226195 A2 | 11/2019 |

OTHER PUBLICATIONS

PCT International Search Report and Written Opinion of International Searching Authority mailed Dec. 17, 2020 corresponding to PCT International Application No. PCT/US2020/028235 filed Apr. 15, 2020.

L. W. Florschuetz; D. E. Metzger; C. R. Truman; (1981) Jet Array Impingement With Crossflow—Correlation of Streamwise Resolved Flow and Heat Transfer Distributions. NASA Contractor Report 3373.

Franziska Warmuth et al., Fabrication and characterisation of a fully auxetic 3D lattice structure via selective electron beam melting. (2017) Smart Mater. Struct. 26 025013.

Yu, Lin & Tan, Hui-Feng & Ma, Teng & Zhou, Zhen-Gong. (2017). A Unit Cell Structure of Smooth Surfaces with Auxetic Response. 10.2991/mme-16.2017.69.

Tan, H., Yu, L. and Zhou, Z. (2017), Negative Poisson's ratio in non-porous smooth curve sheet. Phys. Status Solidi B, 254: 1600612. doi:10.1002/pssb.201600612.

Wang, Yuan & Guan, Ben & Mu, Lei & Zang, Yong. (2018). Equivalent Tensile Properties Analysis of the Dimpled Sheet. Journal of Failure Analysis and Prevention. 10.1007/s11668-018-0455-z.

Körner, Carolin & Liebold-Ribeiro, Yvonne. (2015). A systematic approach to identify cellular auxetic materials. Smart Materials and Structures. 24. 10.1088/0964-1726/24/2/025013.

* cited by examiner

AUXETIC THREE-DIMENSIONAL STRUCTURE UTILIZED IN ADDITIVE MANUFACTURING APPLICATIONS

Aspects of the present disclosure generally relate to tunable structures, specifically structures exhibiting a negative Poisson's ratio, as well as additive manufacturing processes that create such structures.

BACKGROUND

When typical structures or materials are compressed along a particular axis they are most commonly observed to expand in directions orthogonal to the applied load. The property that characterizes this behavior is the Poisson's Ratio, which can be defined as the ratio between the negative transverse and longitudinal strains. Auxetic meta-materials can be designed by developing structures that exhibit negative Poisson's ratio (also known as NPR structures which will be the term utilized hence forth). Meta-materials composed of auxetic structures (i.e., structures that impart Negative Poisson's Ratio behavior) will contract (or expand) in the transverse direction when compressed (or stretched).

Additive Manufacturing (AM) enables the manufacturing of components that are difficult to manufacture using conventional manufacturing techniques. In many of the additive manufacturing processes, the components are manufactured layer by layer. One such additive manufacturing process is Laser Powder Bed Fusion (L-PBF).

BRIEF SUMMARY

In one construction, an auxetic (NPR) structure includes a plurality of vertical intersecting dimpled sheets, each dimpled sheet exhibiting a negative Poisson's ratio, each dimpled sheet intersects two adjacent dimpled sheets to create a rectangular tubular structure, and having a portion of each dimpled sheet projecting outward from its intersection with an adjacent dimpled sheet, the amplitude of each dimple on the plurality of dimpled sheets is such that no overhanging surface of the dimpled sheet exceeds an angle threshold for printability without support structures.

In another construction, a gas turbine component includes a solid outer wall incorporating a repeated auxetic structure, the repeated auxetic structure including a plurality of NPR structures, each NPR structure including a three-dimensional unit cell, the 3D unit cell including the plurality of dimpled sheets having sinusoidal sheets intersecting one another at the saddle points of the sinusoidal waves.

In a further construction, a method of forming a component using an additive manufacturing process including disposing a support structure on a build plate, forming the component by an additive manufacturing process utilizing the support structure in order to support the forming layers of the component during the AM process, and removing the support structure from the formed component. The support structure includes a repeated auxetic structure, the repeated auxetic structure including a plurality of NPR structures, each NPR structure including a three-dimensional unit cell, the 3D unit cell including the plurality of dimpled sheets having sinusoidal sheets intersecting one another at the saddle points of the sinusoidal waves.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Gas turbine engines operate at high temperatures to assure maximum efficiency and minimize undesirable emissions. The engine internal components within the combustion path are often constructed of superalloy materials that have high strength at elevated temperatures. However, superalloy components are typically manufactured using conventional methods such as casting and forging, which impose certain limitations on the component geometry. Additive Manufacturing (AM) is currently an attractive option for manufacturing of components utilized in the hot section of the gas turbine, in part due to the ability to print complex geometries that could not be produced through conventional methods. However, components built utilizing AM processes also typically suffer from cracking during the AM build process and subsequent heat treatment and hot isostatic pressure (HIP) cycle. The present inventors thus propose an auxetic (NPR) structure having tunable mechanical properties that may be additively manufactured with reduced possibility of cracking during the build process, a subsequent heat treatment, and HIP cycle.

Figure 1:
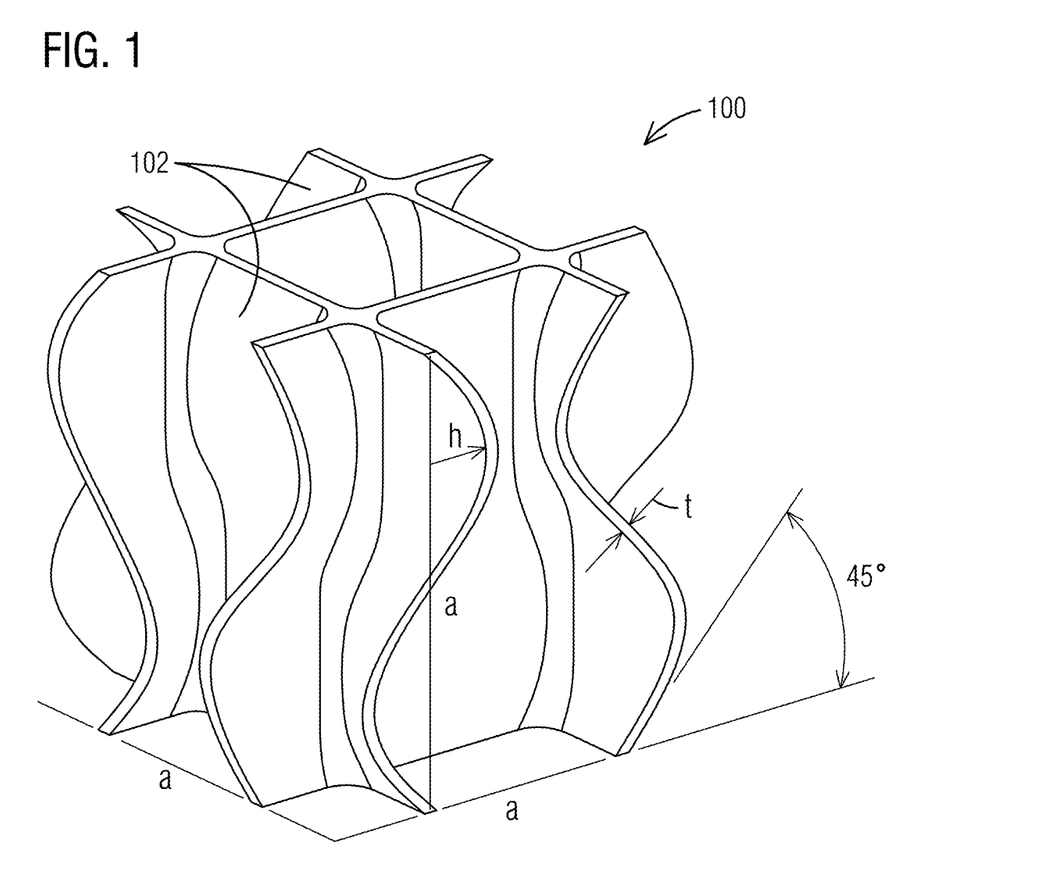
FIG. 1 illustrates a perspective view of a three-dimensional unit cell auxetic (NPR) structure.

FIG. 1 illustrates a three-dimensional (3D) unit cell NPR structure 100. The NPR structure 100 includes a plurality of vertical (with respect to ground) intersecting dimpled sheets 102 to create a 3D structure. Each dimpled sheet may include a sinusoidal undulating wave that intersects an adjacent dimpled sheet at the saddle points of the sinusoidal patterns, positioning the dimpled peaks between the intersections. In an embodiment, each dimpled sheet having a sinusoidal undulating wave intersects an adjacent dimpled sheet orthogonally at the saddle points of the sinusoidal patterns. Each dimpled sheet may thus be constructed from the following equation:

$$z = h^{*}\sin(2\pi x/\lambda)\sin(2\pi y/\lambda) \qquad (1)$$

wherein z is the normal height at a given position (x, y), h is the dimple amplitude and $\lambda$ is the wavelength. The parameter a, shown in FIG. 1, corresponds to the unit cell parameter, where the unit cell is a cube of dimensions a×a×a. In an embodiment of the NPR structure 100, the value of $\lambda$ (wavelength) is equal to a, the unit cell parameter. The thickness of each sheet is defined as t. The illustrated unit cell NPR structure 100 may include fillets, or portions of the intersecting dimpled sheets 102 that project past the intersections. The fillets may be added to avoid stress concentrations.

So that the NPR structure 100 may be manufactured utilizing an AM process, such as by Laser-Powder Bed Fusion (L-PBF), without utilizing a support structure, the NPR structure 100 should not include any overhanging surfaces exceeding an angle threshold for printability without support structures. In the case of the L-PBF process, this angle threshold for printability is typically 45°. Thus, in an embodiment, the NPR structure 100 does not include any overhanging surfaces that exceeds an angle of 45°. This condition may be achieved with the NPR structure 100 by stipulating that:

$$h \leq a/2\pi \tag{2}$$

The derivation of equation (2) may be found by determining the maximum derivative of the dimpled sheet 102. While L-PBF is specifically mentioned as an AM process throughout the disclosure, as one of ordinary skill in the art will appreciate, the proposed NPR structure 100 may also be manufactured using other AM processes. In addition, the threshold angle may vary depending on the material, process, and size.

Figure 2:
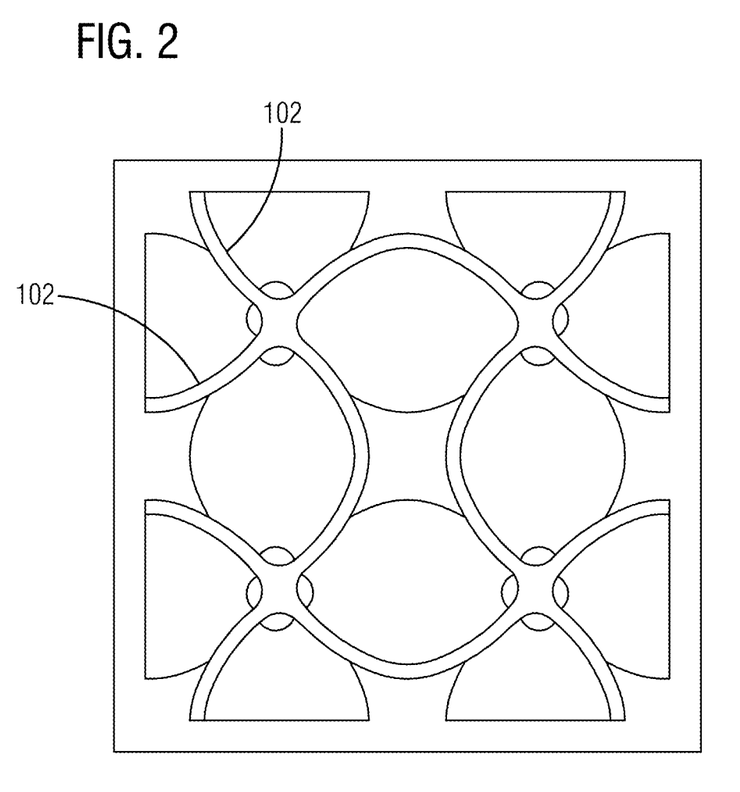
FIG. 2 illustrates a cross-sectional view of the NPR structure of FIG. 1 taken at the position of the dimpled peaks.

If a horizontal plane is taken through the NPR structure 100 at the position of the dimpled peaks, the resulting cross section is as shown in FIG. 2. In two dimensions, this geometry achieves NPR behavior by displacing the curved arcs. As these curved arcs bend, they rotate the intersection nodes, which causes a bending in the transverse arcs as well. The proposed structure takes the two-dimensional NPR behavior of the S-Shaped geometry and translates it into three dimensions. The proposed NPR structure 100 due to its unique geometry, exhibits negative Poisson's ratio in all three orthogonal directions.

In an embodiment, the geometric parameters of the NPR structure 100 may be varied to tune its mechanical properties. The geometric properties of the geometric NPR structure 100, wavelength (A), amplitude (h), and thickness (t) may be seen in FIG. 1. The mechanical properties of the NPR structure 100 may include stiffness, Poisson's ratio (including negative values), density, and thermal conductivity. Several benefits may be obtained when the NPR structure 100 is integrated into a component. By tuning the mechanical properties, it may be possible to lower stresses and improve the heat transfer compared to other structures, i.e., a rod/ligament type structure. For example, lower stresses in the component comprising the NPR structure 100 may be accomplished by tuning the Poisson's ratio (having negative values) alleviating transverse loading from thermal expansion. Other properties (i.e., stiffness and density, for example) may also be tuned to achieve optimal values for stress reduction or improve thermal behavior.

The tunable properties of the NPR structure 100 may be particularly valuable in additively manufactured components. The stress reduction not only improves the life of the component in service, it also improves the printability by reducing stresses caused by strong thermal gradients during build and in subsequent heat treatments and HIP cycles.

Figure 3:
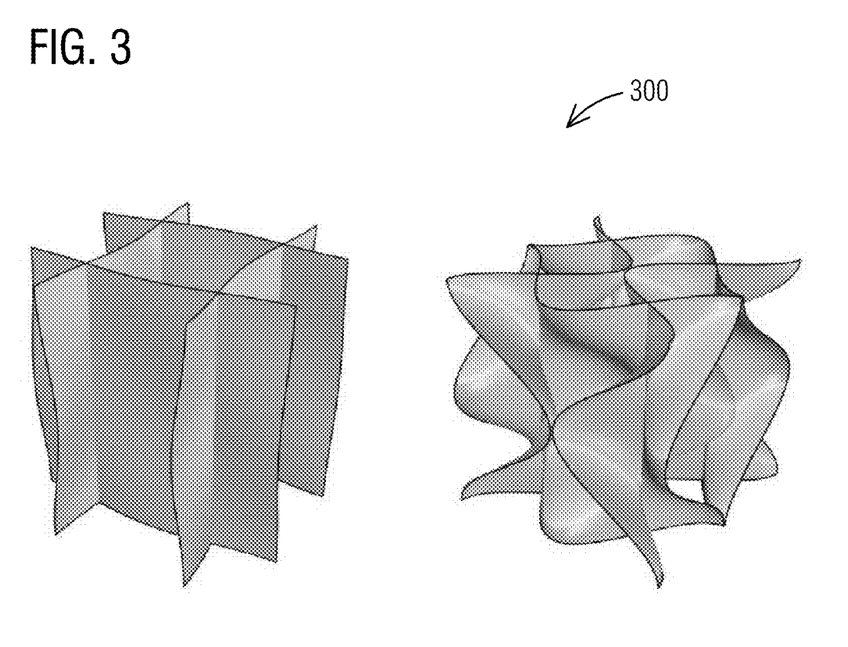
FIG. 3 illustrates two NPR unit cell structures with varied dimple amplitudes.
Figure 4:
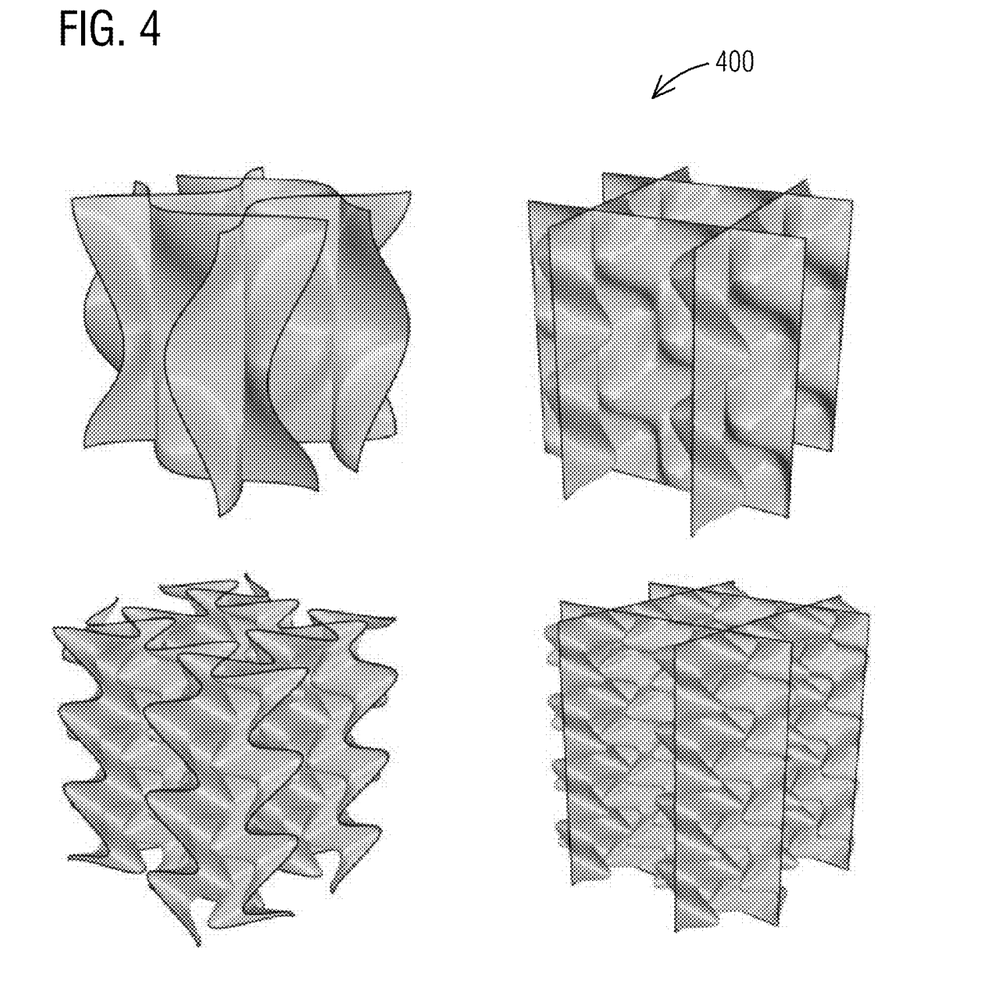
FIG. 4 illustrates four NPR unit cell structures with varied dimple wavelengths.

In order to assess the mechanical properties of the NPR structure 100, a finite-element analysis may be done according to methods known to those of skill in the art for a unit cell having geometric parameters, for example, of a=2 and wall thickness ratio a/t=40. In the examples shown in FIGS. 3 and 4 the amplitude h and the wavelength λ of the NPR structure 100 are varied. FIG. 3 illustrates changing of the amplitude h of the dimples of the NPR structure 300 while FIG. 4 illustrates a changing in the wavelength of the dimples of the NPR structure 400. The results of this analysis show that the Poisson's ratio is maximized when the frequency is only 1 wavelength per unit cell and when the amplitude (h) is approximately 0.1 to 0.15.

Figure 5:
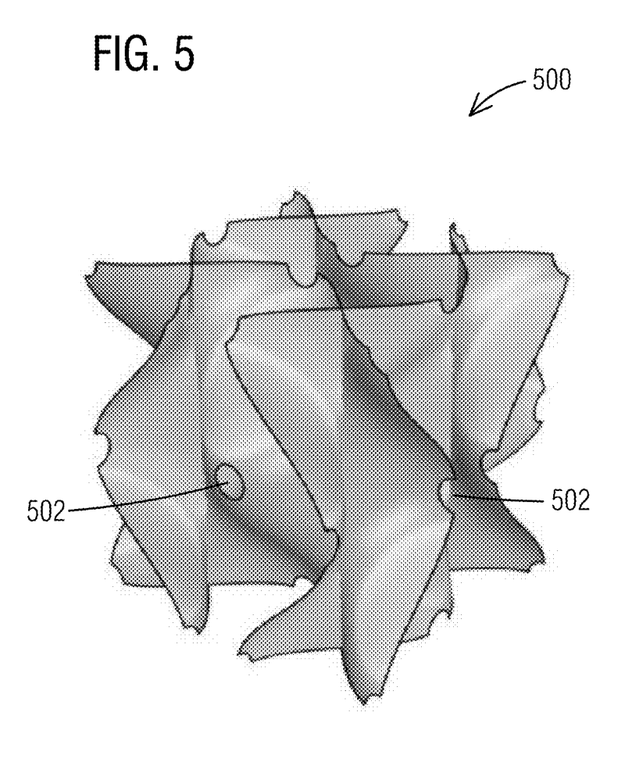
FIG. 5 illustrates the NPR structure of FIG. 1 having holes placed at the peaks of the dimples.

For the life of many gas turbine components, especially those in the turbine section which operates under the highest temperatures in the engine, the components are cooled to prevent melting and other adverse effects from the extreme temperatures. Aside from its mechanical properties, the NPR structure 100, also may provide a cooling function. The fluid volume, created by the voids between the intersecting dimpled sheets 102 of the NPR structure 100, may create channels that can be utilized to carry cooling air through a component comprising the NPR structure 100. In an embodiment, the NPR structure 100 may also include holes in the sheets to allow cross-communication of cooling air between the channels. For example, FIG. 5 illustrates an NPR structure 500 having a plurality of holes 502 added in the NPR structure through the peaks of the dimples. In addition, or alternately, the holes 502 may be placed at the inflection points. Adding holes may also influence the mechanical properties of the NPR structure 100. For example, holes placed at the dimple inflection points will reduce the Poisson's ratio making it more negative, while holes at the peaks will make the Poisson's ratio more positive approaching the bulk value of the material. The holes may be of varying sizes relative to the dimple size.

Figure 6:
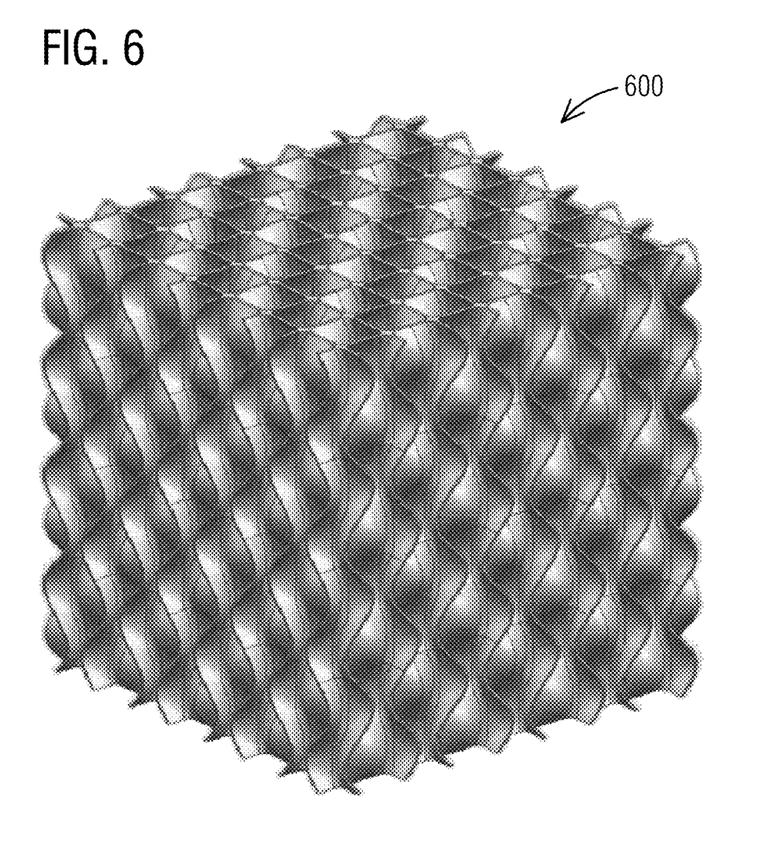
FIG. 6 illustrates a repeated auxetic (NPR) structure.

FIG. 6 illustrates a repeated auxetic (NPR) structure 600 comprising a plurality of NPR structures 100. In the shown example, the repeated NPR structure 600 includes a set of 4×4×4 NPR structure unit cells 100. In certain embodiments, the repeated NPR structure 600 may be incorporated into a component. While a gas turbine component is discussed throughout this disclosure, the repeated NPR structure 600 may be incorporated into a variety of components utilized for a multitude of purposes.

Figure 7:
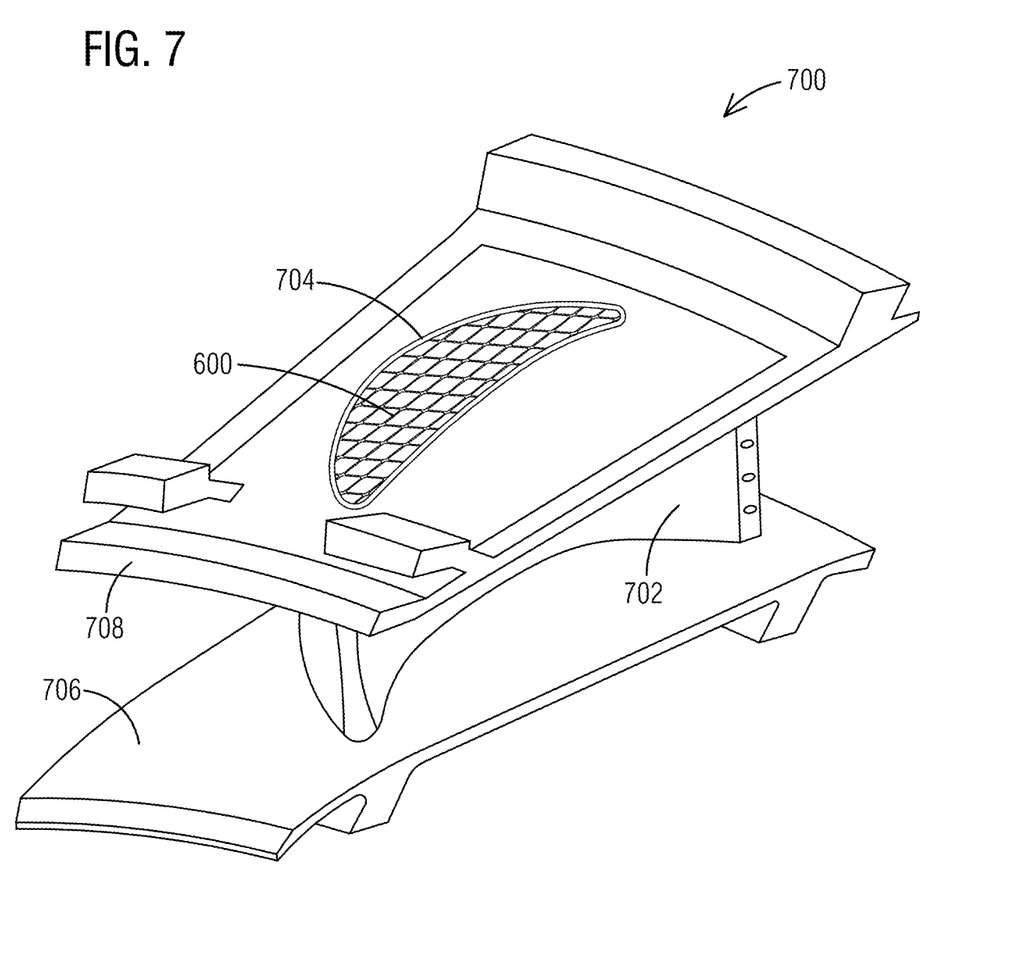
FIG. 7 illustrates a perspective view of a turbine vane incorporating the repeated auxetic structure.

In an embodiment, a repeated NPR structure 600 is incorporated into a gas turbine component. FIG. 7 illustrates a perspective view of a gas turbine component, a turbine vane 700, incorporating the repeated NPR structure 600. Referring to FIG. 7, the turbine vane 700 includes an elongated airfoil 702 having a body with an outer wall 704. The turbine vane 700 may also include an outer shroud 708 at a first end and an inner shroud 706, also known as a platform, at a second end of the turbine vane. The turbine vane 700 may be configured for use in a gas turbine engine. In an embodiment, the repeated NPR structure 600 may be incorporated into an interior portion of the airfoil 702 having a solid outer wall 704. Benefits of the turbine vane 700 having a repeated NPR structure 600 may be stress reduction and advanced cooling.

In an embodiment, the gas turbine component 700 comprises the material, Alloy 247. Alloy 247 is a Ni based alloy that is commonly used for components, such as gas turbine components, in very hot creep-prone environments due to its high strength at elevated temperatures. Having the ability to additively manufacture, i.e., 3D print, gas turbine components in Alloy 247, using, for example, an AM process such as laser-powder bed fusion (L-PBF) instead of casting may reduce the production time and be more cost effective. However, Alloy 247 is known to be difficult to manufacture and is classified as non-weldable. Cracking often occurs during the 3D print process and in post-processing such as during the HIP (hot-isostatic press) cycle. While Alloy 247 has been specifically mentioned as a material that the NPR structure 100 may be composed of, the NPR structure may comprise other materials such as, for example, titanium, stainless steel, plastic and rubber.

Figure 8:
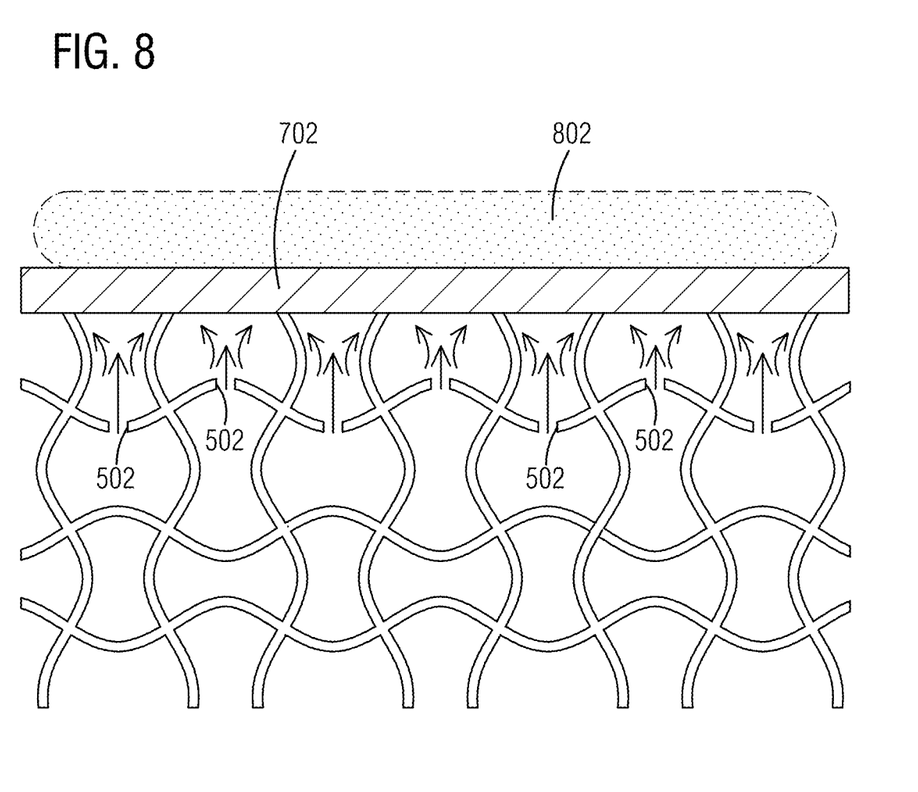
FIG. 8 illustrates a cross sectional view of a repeated auxetic structure having holes at the dimple peaks for impingement cooling.

In an embodiment, the repeated NPR structure 600 includes tunable mechanical properties, as described above, as well as providing a cooling function. Impingement cooling holes may be sized and disposed in the repeated NPR structure 600 to tailor the mechanical properties for managing the thermal fight between a hot wall and the NPR structure 600. For example, FIG. 8 illustrates a cross sectional view of the repeated auxetic structure 600 incorporated into, for example, a turbine vane 700 having a solid outer wall 704 exposed to a hot gas 802 flow which may reach temperatures of 900 degrees C. or hotter. A plurality of holes 502 may be formed in the dimpled peaks as shown in FIGS. 5 and 8. A cooling air flow may be supplied through the channels formed by the repeated NPR structure 600, traveling perpendicular to the view shown in FIG. 8. The cooling air flows through the channels and impinges, as shown, on the solid outer wall 704, cooling the solid outer wall 704.

Support structures are often used for additive manufacturing processes in which the component to be printed is supported by the support structure during the printing process and also sometimes during subsequent heat treatments. The support structure would typically be positioned to support regions of the component that exceed the self-supporting angle threshold which is 45° for most L-PBF processes. A support structure may include thick, strong and dense columnar support which connect the component rigidly to a build plate. These supports counteract high thermal stresses and the tendency of the component to peel away from the build plate. After the component is finished the columnar supports are removed by a machining process. Alternately, thin, lattice supports may be used to support overhanging surfaces to avoid collapse and can be removed by hand or by grit-blasting. These existing support structures have a disadvantage in that they generate localized stress concentrations on the component during the printing process and during post-processing heat treatments and HIP. With alloys that are difficult to weld such as Alloy 247, the existing structures may fracture under the loads caused by thermal gradients.

Figure 9:
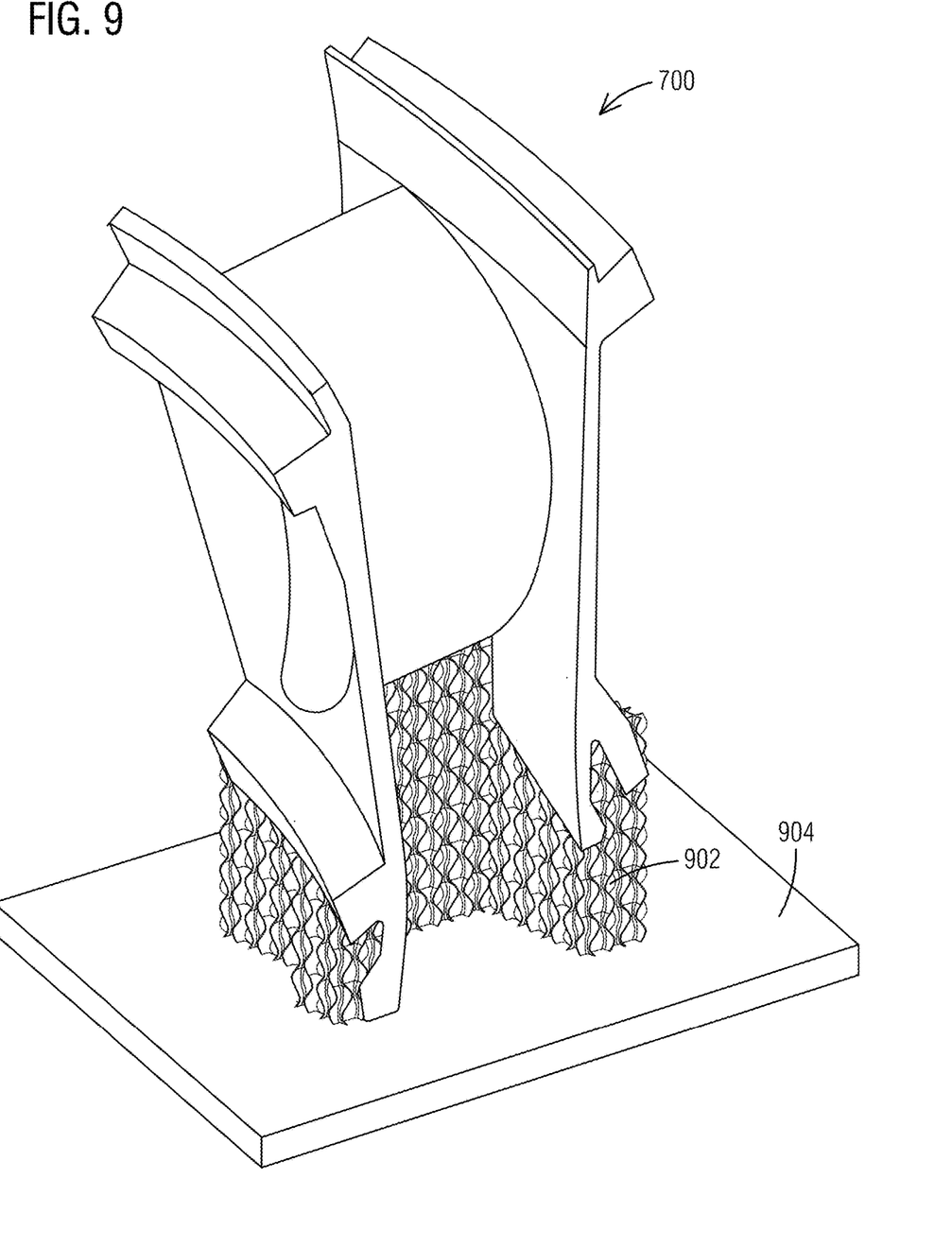
FIG. 9 illustrates a perspective view of a turbine vane utilizing a support structure for an AM process.

Because turbine vanes typically have incorporated platforms 706, 708 that overhang the airfoil 702, the overhanging geometry must be built with a support structure which often fractures during building, thereby causing a build failure. In some cases, these build failures have to be scrapped. Thus, the inventors propose utilizing the repeated auxetic structure 600 as a support structure in an additive manufacturing process. FIG. 9 illustrates a perspective view of a turbine vane 700 utilizing a repeated auxetic structure 600 as a support structure 902. The support structure 902 may be disposed on a build plate 904. As seen in the figure, the support structure 902 extends from a build plate 904 to the component 700. The layers of the component are formed on the support structure 902 during an AM process.

In an embodiment, the mechanical properties of the support structure 902 may be tuned as described above with regards to the NPR structure 100. For example, the support structure 902 may be tuned to respond to the thermal loads of an AM process, such as L-PBF, such that the stresses are minimized.

In summary, the proposed NPR structure 100 includes properties that make it well suited for additive manufacturing processes. For example, there are no transverse or overhanging surfaces which enables the NPR structure 100 to be 3D printed in a Laser-Powder Bed Fusion process without external support structures. When the amplitude of the dimples of the intersecting dimpled sheets 102 is defined such that there are no overhanging surfaces below 45 degrees to the build plate 904, the NPR structure 100 may be used as a support structure itself in order to support overhanging features in printed components. In addition, the NPR structure 100 with its intersecting sheets includes a stiffness and density that enables it to resist the displacement and warping of features from heavy thermal loads. Tuning the Poisson's ratio of the NPR structure 100 may also enable the structure to reduce stress and cracking in additively manufactured components.

Although exemplary embodiments of the present disclosure have been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. An auxetic (NPR) structure, comprising:
   a three-dimensional unit cell, the unit cell including a plurality of vertical intersecting dimpled sheets, each dimpled sheet exhibiting a negative Poisson's ratio,
   wherein each dimpled sheet is sinusoidally-shaped to define a saddle,
   wherein each dimpled sheet intersects two adjacent dimpled sheets at the saddle points of the sinusoidal waves to create a rectangular tubular structure, and wherein a portion of each dimpled sheet projects outward from its intersection with an adjacent dimpled sheet,
   wherein the amplitude of each dimple on the plurality of dimpled sheets is such that no overhanging surface of the dimpled sheet exceeds an angle threshold for three-dimensional printability of the auxetic (NPR) structure, wherein the auxetic (NPR) structure itself provides support to the forming layers of the auxetic (NPR) structure as the auxetic (NPR) structure is additively manufactured without involving an external support structure.

2. The auxetic structure of claim 1, wherein the NPR structure is additively manufactured using a laser-powder bed fusion (L-PBF) process.

3. The auxetic structure of claim 1, wherein a plurality of mechanical properties of the NPR structure are tunable by modifying at least one of the following: a thickness (t) of each dimpled sheet of the plurality of dimpled sheets, an amplitude (h) of each dimpled sheet, and a wavelength ($\lambda$) of each dimpled sheet.

4. The auxetic structure of claim 3, wherein the plurality of mechanical properties is selected from the group consisting of stiffness, Poisson's ratio, density, and heat transfer.

5. The auxetic structure of claim 3, wherein a ratio of an amplitude (h) over a cell length parameter (a) is in a range of 0.1 to 0.15 and wherein the ratio of cell length parameter (a) over the wavelength ($\lambda$) is 1.

6. The auxetic structure of claim 1, wherein the NPR structure includes a hole in each of the plurality of dimpled sheets.

7. The auxetic structure of claim 6, wherein the hole is disposed at a peak or an inflection point of each dimple of the plurality of dimpled sheets.

8. The auxetic structure of claim 1, wherein the angle threshold of printability is 45°.

9. A gas turbine component, comprising:
a repeated auxetic structure comprising a plurality of NPR structures, each NPR structure as recited in claim 1,
wherein in each dimpled sheet being sinusoidally-shaped to define the saddle point, the dimples are positioned at the peaks.

10. The gas turbine component of claim 9, wherein the gas turbine component includes a solid outer wall incorporating the repeated auxetic structure in an interior portion of the component within the solid outer wall.

11. The gas turbine component of claim 9, wherein a plurality of mechanical properties of each NPR structure is tunable by modifying at least one of the following: a thickness (t) of each dimpled sheet of the plurality of dimpled sheets, an amplitude (h) of each dimpled sheet, and a wavelength ($\lambda$) of each dimpled sheet.

12. The gas turbine component of claim 11, wherein the plurality of mechanical properties is selected from the group consisting of stiffness, Poisson's ratio, density, and heat transfer.

13. The gas turbine component of claim 10, wherein the repeated NPR structure further comprises a plurality of holes disposed at the peaks of the dimpled sheets, and
wherein a cooling flow flows into channels formed by the repeated NPR structure, through the plurality of holes, and impinges an interior portion of the solid outer wall in order to cool the solid outer wall.

14. The gas turbine component of claim 13, wherein the gas turbine component is a turbine vane or a turbine blade.

15. The gas turbine component of claim 14, wherein the gas turbine component comprises Alloy 247.

16. The gas turbine component of claim 15, wherein the gas turbine component is additively manufactured using a laser-powder bed fusion (L-PBF) process.

17. A method of forming a component using an additive manufacturing process, comprising:
arranging on a build plate an auxetic (NPR) structure as set forth in claim 1, the method further comprising:
positioning a first plurality of dimpled sheets in a vertical orientation,
intersecting a second plurality of dimpled sheets with the first plurality of dimpled sheets to orthogonally define a rectangular tubular structure, each of the dimpled sheets of the first plurality of dimpled sheets and second plurality of dimpled sheets having a portion projecting outward from its intersection with an adjacent dimpled sheet,
forming the component by the additive manufacturing process utilizing the auxetic (NPR) structure arranged on the build plate to support the forming layers of the component during the AM process; and
removing the auxetic (NPR) structure arranged on the build plate from the formed component,
wherein the auxetic (NPR) structure arranged on the build plate extends from the build plate to the component.

* * * * *